United States Patent

Basora et al.

[11] Patent Number: 5,771,780
[45] Date of Patent: Jun. 30, 1998

[54] ELECTRIC TOASTER

[75] Inventors: Antonio Basora; Julian Arnedo, both of Barcelona, Spain

[73] Assignee: Moulinex S.A., Paris, France

[21] Appl. No.: 860,874

[22] PCT Filed: Jan. 11, 1996

[86] PCT No.: PCT/FR96/00041

§ 371 Date: Aug. 28, 1997

§ 102(e) Date: Aug. 28, 1997

[87] PCT Pub. No.: WO96/21386

PCT Pub. Date: Jul. 18, 1996

[30] Foreign Application Priority Data

Jan. 13, 1995 [FR] France .................................. 95 00378

[51] Int. Cl.⁶ .................................................. A47J 37/08
[52] U.S. Cl. ...................... 99/327; 99/329 P; 99/329 RT; 99/389; 99/391; 219/492; 219/521
[58] Field of Search ...................... 99/326–333, 385–391, 99/393–401, 337, 338; 219/521, 385, 386, 391, 393, 494, 497

[56] References Cited

U.S. PATENT DOCUMENTS

| | | | |
|---|---|---|---|
| 3,684,860 | 8/1972 | Snyder | 99/393 X |
| 4,986,173 | 1/1991 | Hahnewald et al. | 99/338 |
| 5,072,662 | 12/1991 | Yip | 99/327 |
| 5,095,814 | 3/1992 | Ott et al. | 99/391 |
| 5,598,765 | 2/1997 | Yip | 99/391 X |

FOREIGN PATENT DOCUMENTS

| | | |
|---|---|---|
| 0 048 769 | 4/1982 | European Pat. Off. . |
| 0 361 072 | 4/1990 | European Pat. Off. . |
| 0 450 457 | 10/1991 | European Pat. Off. . |
| 26 58 997 | 6/1978 | Germany . |
| 638659 | 6/1950 | United Kingdom . |

*Primary Examiner*—Timothy F. Simone
*Attorney, Agent, or Firm*—Young & Thompson

[57] ABSTRACT

An electric toaster with a housing (1) includes a toasting chamber and a slot (2) provided in the top surface thereof for inserting slices of bread, at least one heating element (3), and at least one bread holder (4) movable up and down on a guide device (6) by a lowering and raising mechanism (8) between the housing (1) and the toasting chamber. The guide device (6) comprises a single vertical slide rail (9) with a slide (10) movably mounted thereon, and the holder (4) is attached only to the slide (10) so that it is cantilevered to the post (9).

9 Claims, 4 Drawing Sheets

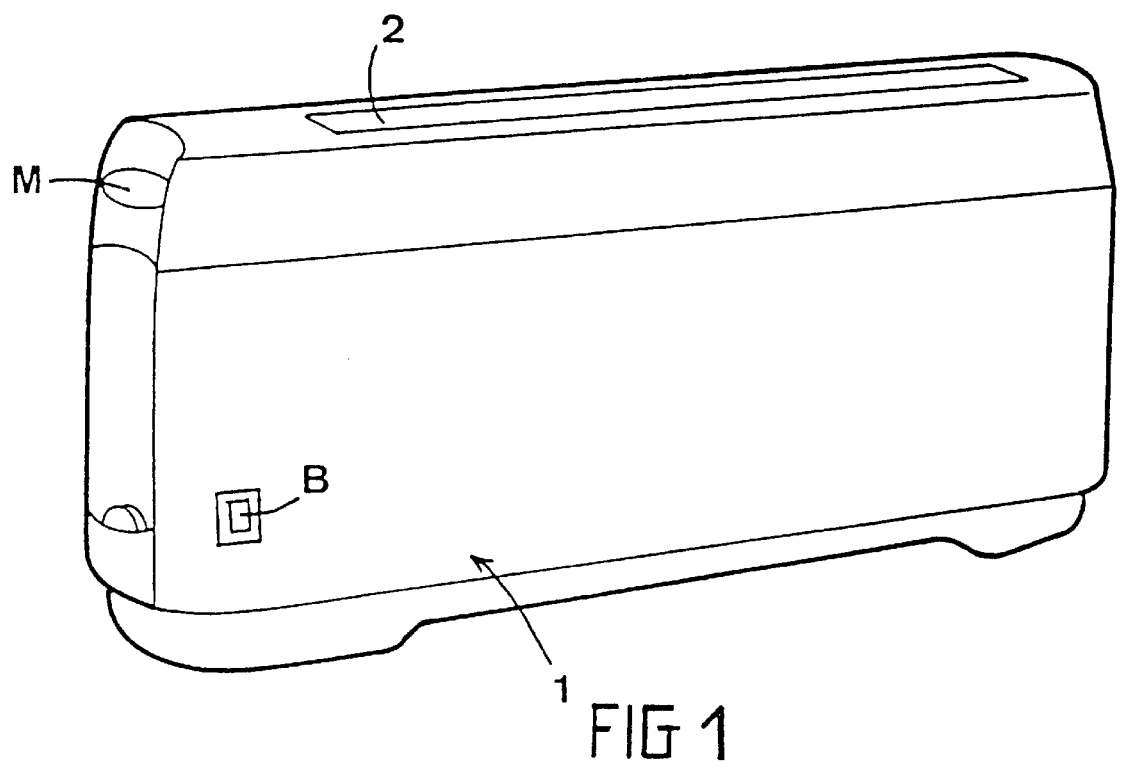

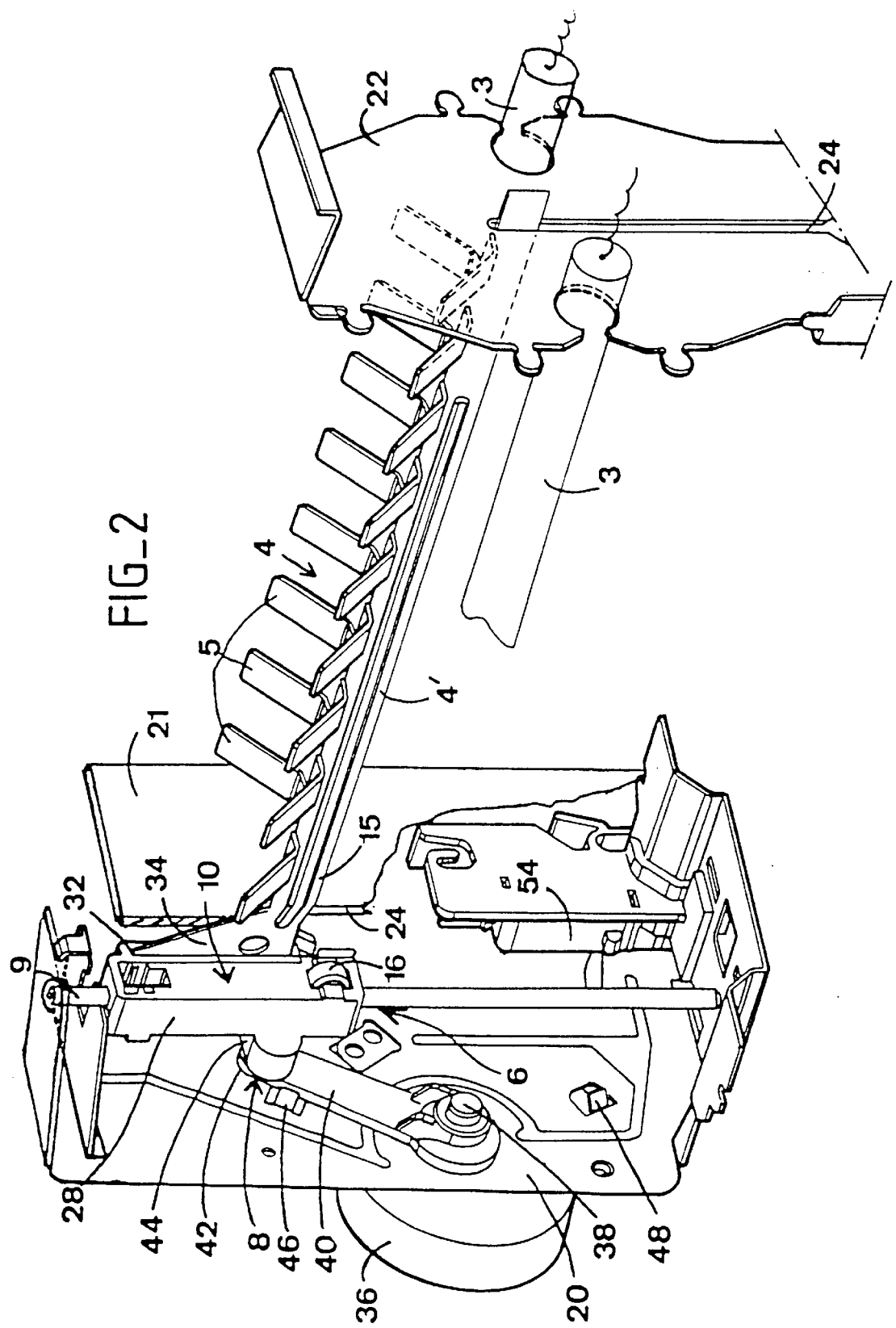
FIG_2

FIG_3
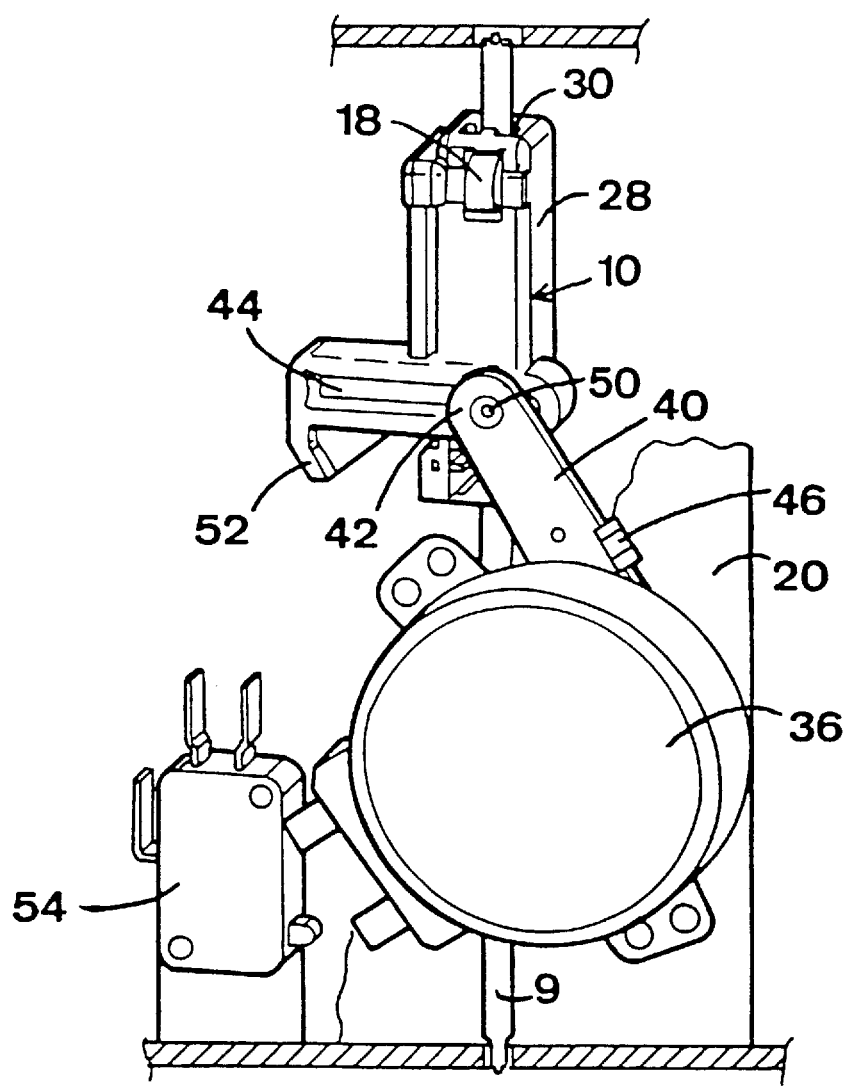

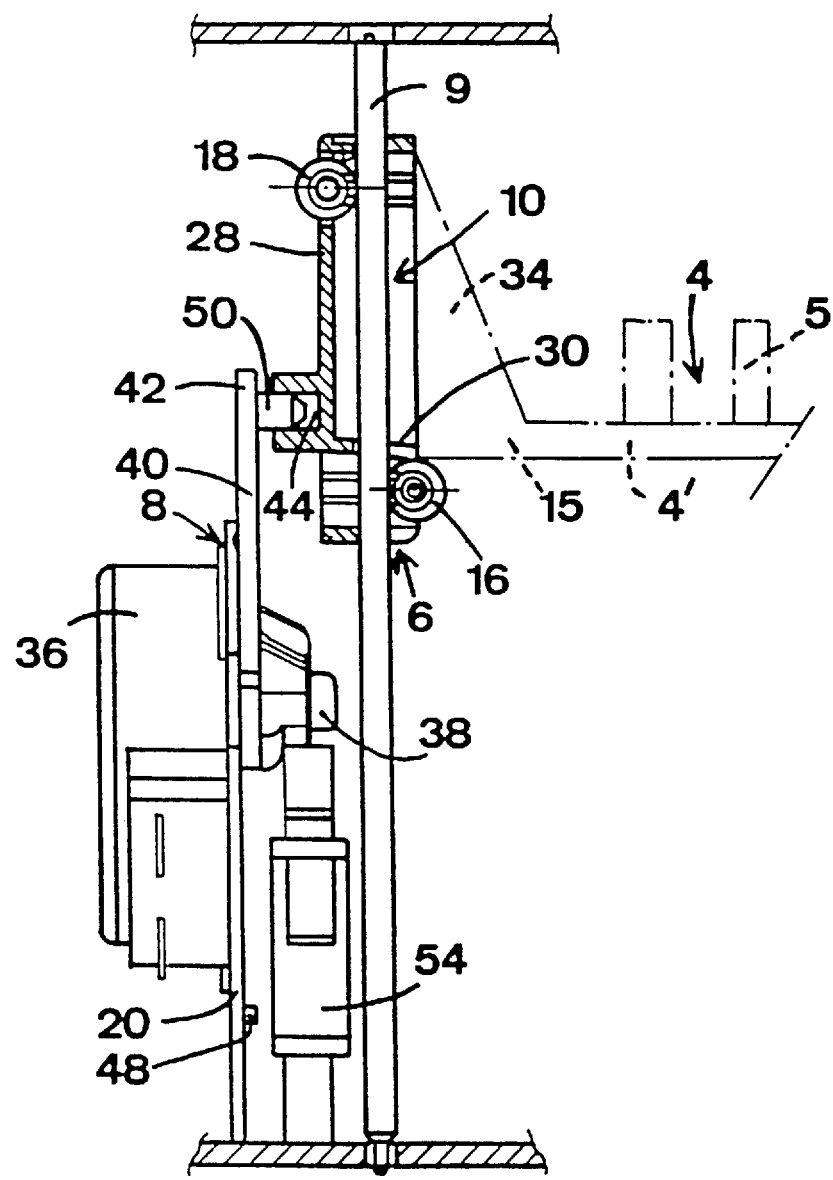
FIG_4

ELECTRIC TOASTER

FIELD OF THE INVENTION

The present invention concerns an electric toaster whose casing has a toasting enclosure of parallelepipedal shape overall having on a top face a slot for the insertion of slices of bread, and enclosing at least one heating element, at least one bread-carrier carriage mounted so as to move vertically on a guide device by means of a lowering and raising mechanism arranged between the casing and the toasting enclosure and designed on the one hand to lower the said carriage to a low position called the toasting position situated at the bottom of the said enclosure and on the other hand to raise the said carriage, after a previously fixed toasting period has elapsed, to a high position called the extraction position for the slices of bread situated in the top part of the casing.

BACKGROUND OF THE INVENTION

In the toasters of this type known in the prior art, the guide devices used and associated with lowering and raising mechanisms are either of complex design, having a structure using parallelism and guaranteeing proper linear guidance, or of mediocre design generally giving rise to a jamming of the bread-carrier carriage inside the enclosure. Furthermore, in the case of the complex design, the result is that there is considerable congestion in the toasting enclosure and the manufacturing time and cost are high.

SUMMARY OF THE INVENTION

The aim of the invention is to overcome these drawbacks by producing a guide device for the bread-carrier carriage whose design, though simple, makes it possible, on the one hand, to minimize the congestion in the toasting enclosure and reduce the time and cost of manufacture of the toaster and, on the other hand, to ensure perfect linear guidance.

According to the invention, the guide device has a single sliding column on which a slider is movably mounted, and the said bread-carrier carriage is attached only to the slider in such a way that it is mounted so as to project on the said column.

By means of the guide device according to the invention, the number of components and therefore the congestion inside the toasting enclosure are appreciably reduced, along with the time and cost of manufacture of the toaster. Furthermore, by virtue of the use of a single slider, friction in the guide device, and therefore noises generated by the various components, are minimized.

According to another particularly advantageous characteristic of the invention, the lowering and raising mechanism of the bread-carrier carriage includes an electric motor unit whose output shaft is equipped with a crank which, through its free end, engages with a runner formed in the slider so as to communicate to it a vertical movement along the said column, thereby bringing the bread-carrier carriage either from the high position to the low position for the purpose of toasting slices of bread, or from the low position to the high position after the slices of bread have been toasted.

Thus, by virtue of the single column/slider assembly, friction between the components having been minimized, it is possible to use a small low-power electric motor unit. Preferably, the said motor unit has a synchronous motor with a rotor with free starting in both directions of rotation.

By virtue of this motor, audible and electrical noise are minimized and the cost of manufacture is substantially reduced.

BRIEF DESCRIPTION OF THE DRAWINGS

Other characteristics and advantages of the invention will, moreover, emerge from the description that follows, taken by way of non-limitative example, with reference to the accompanying drawings in which:

FIG. 1 depicts diagrammatically an overall perspective view of an electric toaster according to the invention;

FIG. 2 is an enlarged partial perspective view of a guide device for a bread-carrier carriage according to the invention mounted in the toaster;

FIG. 3 is a lateral perspective view in the direction of the arrow X in FIG. 2 illustrating a lowering and raising mechanism according to the invention associated with the guide device;

FIG. 4 is a view, partially in vertical section, of the guide device of the bread-carrier carriage along the line IV—IV in FIG. 3 and, in elevation, of the lowering and raising mechanism.

DETAIL DESCRIPTION OF THE INVENTION

FIG. 1 illustrates diagrammatically an electric toaster whose casing 1 has a toasting enclosure of parallelepipedal shape overall, having on a top face a slot 2 for the insertion of slices of bread. As depicted in FIG. 2, the casing encloses two heating elements 3, a bread-carrier carriage 4 mounted so as to move vertically on a guide device 6 by means of a lowering and raising mechanism 8 arranged between the casing 1 and the toasting enclosure and designed, on the one hand, to lower the carriage 4 to a low position called the toasting position situated at the bottom of the enclosure and, on the other hand, to raise the carriage 4, after a previously fixed toasting period has elapsed, to a high position called the extraction position for the slices of bread situated in the top part of the casing 1.

The toaster in FIG. 2 has, in a manner known per se, two heating elements 3 such as quartz or halogen tubes situated respectively on each side of the carriage 4 and controlled by a timing device, not shown, which enables the toasting period to be fixed.

According to a first characteristic of the invention, the guide device 6 has a single sliding column 9 on which a slider 10 is movably mounted, and the bread-carrier carriage 4 is attached only to the slider 10 in such a way that it is mounted so as to project on the column 9. As depicted, the carriage 4 includes a strip 4', disposed in a vertical plane, whose top edge bears retaining fingers 5 for the slices of bread; one 15 of the ends of the strip being connected to the slider 10.

According to an embodiment described preferentially, the slider 10 has at least two sliding devices 16, 18 having a low coefficient of friction with the column 9 and disposed substantially in the same vertical plane on each side of the column 9. The sliding devices 16; 18 are formed by rollers.

As can be seen in FIG. 2, the enclosure has two lateral cheeks 21 and 22, each having a groove 24, visible only on the cheek 22 and designed to allow the strip of the carriage 4 to pass.

As depicted in the drawings, the slider 10 has an oblong cage 28 having a vertical passage 30 in which the column 9 is mounted, and the rollers 16, 18 are disposed in opposition at both ends of the cage 28. As can be seen clearly in FIG. 4, the active parts of the rollers project respectively in the passage 30 so as to obtain contact at one point with the column 9. The slider 10 also has a lateral housing 32 in which there is fixed an angle bracket 34 secured to the end 15 of the strip on the carriage. As will be understood, the slider can be driven in different ways. In a first example embodiment, not shown, the slider 10 can be driven directly by a lever M movably mounted vertically in a known manner on the casing. By virtue of this guide device, a gentle sliding without excessive friction is obtained which ensures a high level of convenience.

In a second example embodiment and according to a second important characteristic of the invention, the lowering and raising mechanism of the carriage 4 equipping the toaster has an electric motor unit 36 which is mounted on a cheek 20 and whose output shaft 38 is equipped with a crank 40 which, through its free end 42, engages with a runner 44 formed in the slider 10 so as to communicate to it a vertical movement along the column 9, thereby bringing the carriage 4 either from the high position to the low position for the purpose of toasting slices of bread, or from the low position to the high position after the slices of bread have been toasted. The cheek 20 is U-shaped overall (FIG. 2) and holds the column 9 vertically between its arms.

As can be seen better in FIGS. 3 and 4, the runner 44 is formed, in a transverse projection on the slider 10, by an oblong recess running transversely to the column 9 and in which a pin 50 borne by the end 42 of the crank 40 comes to slider. The motor unit 36 advantageously includes a synchronous motor equipped with a reduction gear and having a rotor with free starting in both directions of rotation. By virtue of the low friction of the slider 10 on the column 9, it is possible to use a low-power synchronous motor, for example of 2.5 Watts, which is therefore very small.

Such a motor effects the movements of the carriage 4 along the sliding column 9 both for positioning the carriage 4 in the toasting position and for raising the carriage to the position of extraction of the toasted slices of bread.

Another advantage of such a motor, apart from its low cost, is the fact that it is associated with an electronic control device, not shown, which on the one hand controls the rotation of the and on the other hand controls the operation of the heating elements 3.

As can be seen in FIGS. 2 and 3, the cheek 20 situated between the casing and the cheek 21 has an upper stop 46 and a lower stop 48 disposed angularly with respect to the output shaft 38 of the motor. The stops 46, 48 enable the movement of the crank 40 to be limited either at a bottom position or at a top position for which the slider 10 is in the high position.

Referring to the drawings, the operation of the guide device and of the lowering and raising mechanism associated with it according to the invention will now be described.

When a start button, depicted in B in FIG. 1, is pressed, the rotor of the synchronous motor begins to rotate, driving the output shaft 38. As this synchronous motor has no non-return mechanism, the free rotor can start in any direction. But, as the crank 40 is at the stop, for example at 46, the rotor will, owing to feedback, turn in the desired direction to rotate the crank 40 as far as the lower stop 48. The lug 50 borne by the end 42 of the crank 40 moves in the runner 44 in such a direction that it exerts on the slider 10 a vertical downward force. Under the action of this force, the slider 10, initially in the high position, moves along the column 9 towards the toasting position, driving the carriage, previously filled with slices of bread to be toasted. As will be understood, by virtue of the opposing arrangement of the rollers 16 and 18, the forces on the slider and notably the torque imposed by the projecting carriage are well balanced and the slider moves without effort along the column 9. When the crank reaches the lower stop 48, the slider comes to act through a finger 52 (FIG. 3) on a switch 54 which sends to an electronic control device (not shown) a signal to interrupt the supply to the motor and to activate quartz tubes 3 for a previously fixed period. At the end of this period, the electronic control device triggers the rotation of the rotor of the synchronous motor, which automatically starts up in the right direction by virtue of the stop 48. The movement of the lug SO in the runner 44 in the opposite direction to its previous movement exerts an upward vertical force on the slider 10. The slider 10 then moves under the action of this force, upwards along the column 9, thereby driving the carriage 4 towards the position of extraction of the slices of bread until it comes to bear on the stop 46. At the same moment, the electronic control device cuts off the supply to the motor.

By virtue of the guide device according to the invention and the lowering and raising mechanism associated with it, reliable and flexible toaster operation and minimum congestion within the toasting enclosure are obtained. Furthermore, the ease of sliding the slider along the sliding column enables a low-power motor of relatively low cost to be used.

We claim:

1. Electric toaster comprising:

a casing defining a toasting enclosure of parallelepipedal shape overall and having on a top face a slot for the insertion of slices of bread;

at least one bread-carrier carriage mounted so as to move vertically on a guide device;

a lowering and raising mechanism arranged between the casing and the toasting enclosure for lowering the carriage to a low toasting position situated at the bottom of the enclosure and for raising the carriage, after a previously fixed toasting period has elapsed, to a high extraction position for removal of toasted slices of bread;

said guide device including a single sliding column having a slider movably mounted thereon, said carriage being attached only to the slider such that said carriage is cantilevered from said column; and said slider including at least two sliding devices having a lower coefficient of friction with the column and disposed substantially in the same vertical plane on each side of the column.

2. Electric toaster according to claim 1, wherein the sliding devices comprise rollers.

3. Electric toaster according to claim 1, wherein the slider has an oblong cage having a vertical passage in which the column is mounted, said sliding devices being disposed in opposition at both ends of the cage and having active parts which project respectively in the passage so as to contact the column.

4. Electric toaster according to claim 3, wherein the bread-carrier carriage includes a strip disposed in a vertical plane, said strip having a top edge which bears fingers, said slider comprising a lateral housing having an angle bracket fixed therein, and said angle bracket being secured to one end of the strip.

5. Electric toaster according to claim 1, wherein the lowering and raising mechanism comprises an electric motor unit having an output shaft which is equipped with a crank, said crank having a free end which engages with a runner formed in the slider so as to communicate to said slider a vertical movement along the column, thereby bringing the carriage either from the high extraction position to the low toasting position for toasting slices of bread, or from the low toasting position to the high extraction position after the slices of bread have been toasted.

6. Electric toaster according to claim 5, wherein the electric motor unit includes a synchronous electric motor equipped with a reduction gear.

7. Electric toaster according to claim 6, wherein the synchronous motor has a rotor with free starting in both directions of rotation.

8. Electric toaster according to claim 5, wherein the runner is formed, in a projection borne by the slider, by an oblong recess running transversely to the column, and the free end of the crank having a pin which slides in said recess.

9. Electric toaster according to claim 5, wherein the motor unit is mounted on a cheek which has a lower stop and an upper stop disposed angularly with respect to the output shaft for limiting the movement of the crank either at a bottom position in which the slider is in the low toasting position, or at a top position in which the slider is in the high extraction position.

* * * * *